United States Patent
Ducatel et al.

(10) Patent No.: US 10,044,698 B2
(45) Date of Patent: *Aug. 7, 2018

(54) DYNAMIC IDENTITY CHECKING FOR A SOFTWARE SERVICE IN A VIRTUAL MACHINE

(71) Applicant: British Telecommunications Public Limited Company, London (GB)

(72) Inventors: Gery Michel Ducatel, London (GB); Theo Dimitrakos, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/126,925

(22) PCT Filed: Mar. 17, 2015

(86) PCT No.: PCT/GB2015/050768
§ 371 (c)(1),
(2) Date: Sep. 16, 2016

(87) PCT Pub. No.: WO2015/140530
PCT Pub. Date: Sep. 24, 2015

(65) Prior Publication Data
US 2017/0099278 A1    Apr. 6, 2017

(30) Foreign Application Priority Data
Mar. 18, 2014  (EP) ..................... 14250048

(51) Int. Cl.
*H04L 29/06*      (2006.01)
*G06F 21/31*      (2013.01)

(52) U.S. Cl.
CPC .............. *H04L 63/08* (2013.01); *G06F 21/31* (2013.01); *H04L 63/107* (2013.01); *H04L 2463/082* (2013.01)

(58) Field of Classification Search
CPC . H04L 63/08; H04L 63/107; H04L 2463/082; G06F 21/31

See application file for complete search history.

(56) References Cited

U.S. PATENT DOCUMENTS

2002/0087894 A1   7/2002  Foley et al.
2003/0115142 A1   6/2003  Brickell et al.
(Continued)

FOREIGN PATENT DOCUMENTS

EP        1603003 A1     12/2005
WO    WO 2007/115209 A2  10/2007

OTHER PUBLICATIONS

U.S. Appl. No. 15/126,861, filed Sep. 16, 2016. Inventor(s): Ducatel et al.
(Continued)

*Primary Examiner* — Wasika Nipa
(74) *Attorney, Agent, or Firm* — Amy M. Salmela; Patterson Thuente Pedersen, P.A.

(57) ABSTRACT

A selector apparatus to select one or more shared authentication facilities for a software service executing in a virtualized shared computing environment, the software service including an interface through which a user request to access a restricted resource of the service is receivable, the request having associated a user context defining one or more characteristics of the user, and the software service further having associated a plurality of authentication rules for the service, wherein each rule is associated with one or more user contexts and identifies one or more shared authentication facilities for the computing environment, the selector apparatus comprising: a launcher, responsive to a user request received via the interface, adapted to instantiate one or more authentication facilities in accordance with an authentication rule retrieved based on a user context for the received request, so as to generate one or more challenges (Continued)

for the user to authenticate the user, wherein the authentication rule further defines one or more parameters for the identified authentication facilities.

15 Claims, 4 Drawing Sheets

(56) References Cited

U.S. PATENT DOCUMENTS

| | | | |
|---|---|---|---|
| 2007/0079136 | A1 | 4/2007 | Vishik et al. |
| 2008/0028453 | A1* | 1/2008 | Nguyen ................ G06F 21/335 726/9 |
| 2011/0047608 | A1 | 2/2011 | Levenberg |
| 2011/0314549 | A1* | 12/2011 | Song ....................... G06F 21/31 726/25 |
| 2012/0137340 | A1 | 5/2012 | Jakobsson et al. |
| 2013/0047204 | A1 | 2/2013 | Radhakrishnan |
| 2017/0011212 | A1 | 1/2017 | Rowlingson |
| 2017/0093920 | A1 | 3/2017 | Ducatel et al. |

OTHER PUBLICATIONS

Application and Filing Receipt for U.S. Appl. No. 15/120,566, filed Aug. 22, 2016, Inventor(s): Robert Rowlingson.

International Preliminary Report on Patentability for corresponding International Application No. PCT/GB2015/050768 dated Sep. 20, 2016; 7 pages.

International Search Report for corresponding International Application No. PCT/GB2015/050768 dated Jun. 19, 2015; 3 pages.

Written Opinion of the International Searching Authority for corresponding International Application No. PCT/GB2015/050768 dated Jun. 19, 2015; 6 pages.

Bolten, Joshua B.; Executive Office of the President Office of Management and Budget, Washington, D.C.; Dec. 16, 2003 M-04-04; Memorandum to the Heads of All Departments and Agencies; E-Authentication Guidance for Federal Agencies; 17 pages.

Burr et al.; NIST Special Publication 800-63-2; Electronic Authentication Guideline; Computer Security; U.S. Department of Commerce Aug. 2013; 123 pages.

Clare et al., "Knowledge Discovery in Multi-Label Phenotype Data" Principles of Data Mining and Knowledge Discovery (Aug. 28, 2001) vol. 2168; pp. 42-53; 12 pages total.

Bouneffouf et al., Following the User's Interests in Mobile Context-Aware Recommender Systems: The hybrid-E-greedy algorithm; 2012 26th International Conference on Advanced Information Networking and Applications Workshops; Department of Computer Science, Telecom SudParis, UMR CNRS Samovar, 91011 Evry Cedex, France; pp. 657-662; 6 pages total (IEEE, 2012).

* cited by examiner

DYNAMIC IDENTITY CHECKING FOR A SOFTWARE SERVICE IN A VIRTUAL MACHINE

CROSS-REFERENCE TO RELATED APPLICATIONS

The present application is a National Phase entry of PCT Application No. PCT/GB2015/050768, filed on 17 Mar. 2015, which claims priority to EP Patent Application No. 14250048.7, filed on 18 Mar. 2014, which are hereby fully incorporated herein by reference.

TECHNICAL FIELD

The present disclosure relates to user authentication for software services. In particular, the present disclosure relates to user authentication for software services in a virtualized shared computing environment.

BACKGROUND

The increasing deployment of software applications to service based environments, such as Software as a Service (SaaS), Infrastructure as a Service (IaaS), Platform as a Service (PaaS) and cloud computing environments, places a greater burden on application owners and service providers to ensure applications comply with compliance requirements and to demonstrate such compliance. Compliance requirements can be many and varied and can originate from, inter alia, legal or regulatory requirements, application owner requirements, technical requirements, compatibility requirements, and service level agreement requirements.

In particular, authentication—also known as identity checking—as part of access control for restricted resources associated with cloud computing services is increasingly complex due to a number of factors affecting the implementation, acceptability, reuse, configuration and policy compliance of authentication mechanisms. Consequently, cloud computing services define comprehensive authentication schemes specifying authentication requirements for users seeking access to cloud computing resources. For example, financial services cloud computing resources can be secured by a multi-factor authentication scheme, such as a two-factor scheme requiring a hardware token identifier coupled with a shared secret. Further, compliance requirements for authentication can vary depending on user context. For example, users accessing a cloud computing resource from a fixed terminal over a secure connection require authentication with a first level of assurance, while users accessing the resource from a mobile terminal, such as a mobile telephone, can require authentication with a second level of assurance.

Context based authentication is known. US Patent Publication No. 2007/0079136A1 describes methods and systems for performing authentication based at least in part on the context of a transaction. Further, European Patent Publication No. EP1603003A1 describes a method of authorizing a user in communication with a workstation using different methods for authorization in dependence on combinations of user data and workstation data, such as a geographic location of the workstation.

However, a mechanism for providing such context-sensitive authentication in an environment where authentication facilities are shared, such as a cloud computing environment, is not known from the art. In a cloud computing environment it is not possible to configure an authentication facility in a "one size fits all" manner. Similarly, it is not possible to apply the context-sensitive approaches of the prior art to such environments.

The complexity of the concerns affecting authentication in cloud computing environments increases across multiple services (potentially delivered on behalf of disparate and possibly competing organizations), with multiple authentication and security compliance requirements, with multiple authentication contexts.

Thus it would be advantageous to provide for compliant authentication of users requesting access to restricted resources of services executing in cloud computing environments with shared authentication facilities.

SUMMARY

The present disclosure accordingly provides, in a first aspect, a user authentication method for a software service executing in a virtual machine of a shared computing environment comprising: receiving an indication of a user request to access a restricted resource of the service, the request having associated a user context defining one or more characteristics of the user; retrieving an authentication rule for the service based on the user context, the authentication rule identifying one or more shared authentication facilities for the computing environment; and instantiating one or more authentication facilities in accordance with the authentication rule to generate one or more challenges for the user so as to authenticate the user, wherein the authentication rule further defines one or more parameters for the identified authentication facilities.

Thus, in this way, authentication facilities for the user request are instantiated according to the authentication rules in order that appropriate and compliant authentication challenges are communicated to the user. The instantiated authentication facilities are taken from a set of shared authentication facilities configured based on a configuration stored as part of, with, or in association with, the authentication rules. The instantiated authentication facilities are selected based on a user context associated with the request and defined by the rules. Accordingly, embodiments of the present disclosure provide compliant authentication methods for services using shared authentication facilities without a need to individualize authentication facilities within services or virtual machines.

In an embodiment, the shared computing environment is a cloud computing environment.

In an embodiment, the user context defines characteristics of the user taken from the set of: geographic location characteristics; computer network location characteristics; user device characteristics; user device type; user device facilities; user device capabilities; user device software version; and a class of the user in an access control system.

In an embodiment, the authentication facilities are represented in an ontology of concepts such that at least a subset of the concepts in the ontology represent at least a subset of the shared authentication facilities.

In an embodiment, the ontology further defines relationships between two or more of the authentication facilities.

In an embodiment, the ontology further defines properties of one or more of the authentication facilities.

In an embodiment, the rule is retrieved from a set of rules, and wherein the ontology and the rule implement a compliance requirement for an authentication scheme of the service in respect of at least the restricted resource.

In an embodiment, the method further comprises: recording the instantiated authentication facilities in association with an identification of the user so as to trigger re-authentication of the user in the event of a change to at least one of: an authentication rule; and the one or more shared authentication facilities.

In an embodiment, the service is one of a plurality of services executing in the computing environment, the method further comprising: evaluating a measure of entropy for the frequency of use of each of the shared authentication facilities by the services, the measure of entropy indicating a degree of variability of the shared authentication facilities; and in response to a determination that the measure of entropy meets a threshold measure, performing: a) comparing authentication rules for each of the services to measure similarity of rules to identify a set of services having most similar rules as a consistent set, and to further identify one or more outlier services as services having rules least consistent with the rules of the services in the consistent set; b) generating one or more recommended rules for the outlier services based on the rules of the services in the consistent set.

The present disclosure accordingly provides, in a second aspect, a selector apparatus to select one or more shared authentication facilities for a software service executing in a virtualized shared computing environment, the software service including an interface through which a user request to access a restricted resource of the service is receivable, the request having associated a user context defining one or more characteristics of the user, and the software service further having associated a plurality of authentication rules for the service, wherein each rule is associated with one or more user contexts and identifies one or more shared authentication facilities for the computing environment, the selector apparatus comprising: a launcher, responsive to a user request received via the interface, adapted to instantiate one or more authentication facilities in accordance with an authentication rule retrieved based on a user context for the received request, so as to generate one or more challenges for the user to authenticate the user, wherein the authentication rule further defines one or more parameters for the identified authentication facilities.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF EMBODIMENTS

Figure 1:
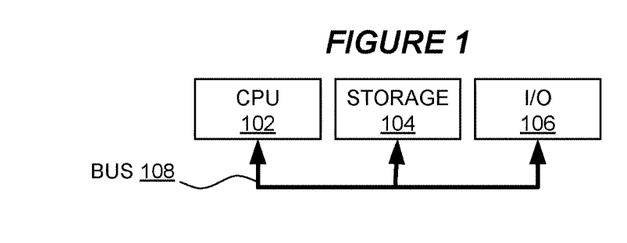
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
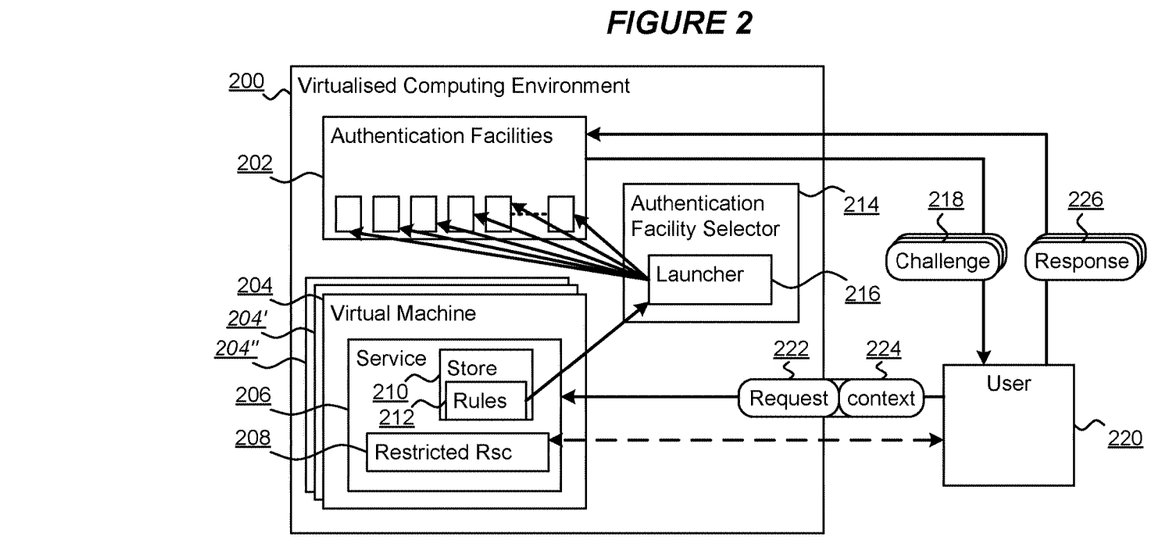
FIG. 2 is a component diagram of a virtualized computing environment including an authentication facility selector in accordance with embodiments of the present disclosure.

FIG. 2 is a component diagram of a virtualized computing environment 200 including an authentication facility selector 214 in accordance with embodiments of the present disclosure. The virtualized computing environment 200 is an environment for the deployment of software services such as service 206. For example, the service 206 can be provided as a software component or application executing with an operating system within a virtual machine 204 of the virtualized computing environment. The virtual machine 204 operates with a hypervisor on one or more hardware computing devices or, potentially, a distributed arrangement of hardware devices. Examples of hypervisor's include native hypervisors that execute in conjunction with specific hardware, such as Oracle VM Server for SPARC, VMware ESX/ESXi or KVM (Oracle, Oracle VM Server and SPARC are trademarks or registered trademarks of Oracle Corporation in some countries. VMware is a trademark or registered trademark of VMware, Inc in some countries.) Additionally, hypervisors can be hosted in existing operating environments, for example BHyVe, VMware Workstation and VirtualBox (VirtualBox is a trademark or registered trademark of Oracle Corp.) The virtualized computing environment 200 can be provided as a service-based technology such that the virtual machine 204 is delivered as a service for the installation and execution of a software services such as service 206. While the virtual machine 204 is depicted in FIG. 2 with a single service 206, it will be appreciated that more than one software service could execute within the virtual machine 204. Virtual machine 204 is one of potentially many virtual machines executing in the virtualized computing environment 200, any or all of which execute one or more software services. In a preferred embodiment, the computing environment 200 and/or virtual machines 204, 204', 204" are provided as part of a cloud computing service provided by a cloud computing service provider such as BT Cloud Compute available from British Telecommunications plc. Additionally or alternatively, the virtualized computing environment 200 and/or virtual machines 204, 204', 204" can be provided as, or operate with, a service based infrastructure and/or platform such as SaaS, IaaS and/or PaaS.

The service 206 includes a restricted resource 208 such as a software, hardware or firmware resource, data item such as a data structure, database, database entry or any other conceivable resource to which access may be restricted. As part of an access control mechanism to control access to the restricted resource 208 by a user 220, authentication of the user 220 is required. The computing environment 200 includes a plurality of shared authentication facilities 202 being shared by multiple virtual machines 204, 204', 204" and/or by multiple services executing on any or each of the virtual machines 204, 204', 204". Each of the authentication facilities provides an authentication service for authenticating the user 220 based on a challenge/response mechanism such that the user 220 receives a challenge 218 to which the user 220 provides a response 226. Expected responses are predetermined or evaluated such that receipt of an expected response is suitable for authenticating the user 220. Different authentication facilities can have different degrees of reliability or assurance, such degrees being quantifiable such as by subjective or objective ranking, rating or scoring authentication facilities or by way of a measure of the effectiveness or rate of success/failure of authentication facilities.

Example authentication services include, inter alia: authentication based on a secret shared between a user and an authentication facility, such as a passphrase, password or code; a token based authentication by exchanging a time-synchronized or mathematical-algorithm-based passphrase, password or code generated by a token such as a hardware or software token; authentication based on access to a facility such as a mobile or cellular telephone, a computer system or other device or software component, to which a secret is communicated, such as a short-message-service message communicated to a mobile telephone in possession of the user 220; a biometric authentication scheme such as a fingerprint, iris, facial recognition, retina, palm or other biometric based mechanism for authenticating the user 220; a question-based authentication process whereby a user is requested to respond to question challenges, the responses to which are indicative of a particular user and constitute an authentication method; and any other conceivable authentication method howsoever effective, assured or reliable.

The user 220 pre-registers, enrolls or configures each of the authentication facilities 202 that can be employed subsequently to authenticate the user 220. Such configuration is specific to each type of authentication and serves to render the authentication facilities suitable for authenticating the user 220. For example, a passphrase based authentication facility is initially configured to define a passphrase for association with the user 220. A biometric based authentication facility is configured by calibrating or storing a record of biometric information for the user 220, such as a fingerprint for the user 220. Thus, following pre-registration by the user 220, the authentication facilities 202 are able to authenticate the user 220 with some degree of assurance based on the challenge 218 and response 226 process described above.

The service 206 has associated one or more rules 212 defining authentication workflows as a series of one or more of the authentication facilities 202 for use in authenticating a user 220 seeking access to the restricted resource 208. The rules 212 can be specific to the restricted resource 208, or a group or class of restricted resources. Alternatively, the rules 212 can be specific to the service 206 or a group or classes of services. In a further alternative, the rules 212 can be specific to the virtual machine 204 or a group or class of virtual machines. In an embodiment, the rules 212 are stored in a data store 210 in association with the service 206. It will be appreciated by those skilled in the art that the rules 212 could alternatively be stored outside the service 206 and accessible to the service 206. Most preferably the rules 212 are securely stored to avoid malicious or unauthorized inspection or alteration of the rules 212.

Figure 4:
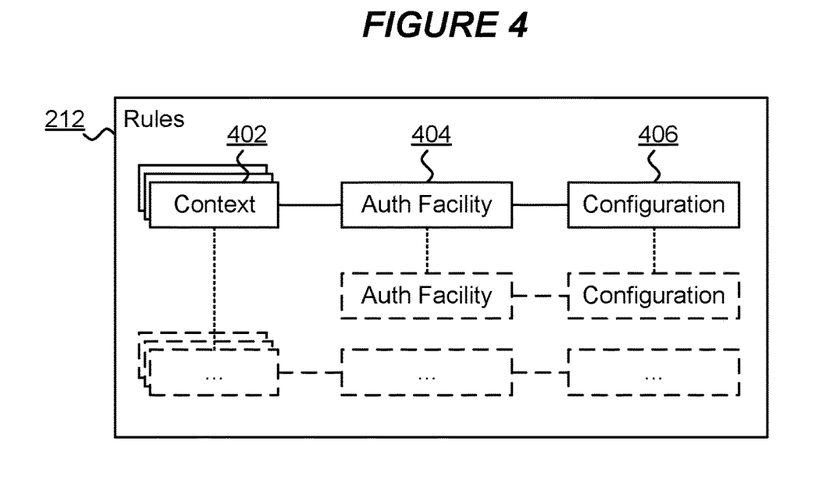
FIG. 4 illustrates an exemplary arrangement of the authentication rules of FIG. 2 in accordance with embodiments of the present disclosure.

FIG. 4 illustrates an exemplary arrangement of the authentication rules 212 of FIG. 2 in accordance with embodiments of the present disclosure. The rules include an association between one or more user contexts 402, one or more authentication facilities 404 and, optionally, a configuration 406 for each authentication facility. A user context 402 defines one or more characteristics of the user 220. Such characteristics many and varied and include, inter alia: a location of the user 220, such as a geographic location, a relative location, a network location etc.; a hardware device via which the user 220 requests access to the restricted resource 208, such as a type of device (e.g. tablet, laptop, desktop, terminal, smartphone and the like) or a specific device (model and manufacturer, serial number etc.); characteristics of a device or software component via which the user requests access to the restricted resource 208, such as an operating system type or version, a security configuration, a state of operation, a software configuration state including the installation or configuration of certain security software and the like; a category, class or type of the user 220, such as a user class assigned by a system administrator, or a job role or function of the user. Other suitable contextual characteristics will be apparent to those skilled in the art and embodiments of the present disclosure are not limited to specific characteristics. Notably, the context 402 for a rule can further include characteristics of the restricted resource 208 to which the user 220 requests access (and, accordingly, constitute characteristics associated with the user 220), such as a type of resource or a level of security of the resource. Further, the context 402 can include a combination of characteristics for both the restricted resource 208 and the user 220.

Thus, each rule in the one or more rules 212 defines, for one or more particular user contexts 402, a set of one or more authentication facilities 404 to be instantiated for authentication of the user 220. The set of authentication facilities 404 can be considered an authentication workflow since it defines one or more authentication facilities required for authentication. Each authentication facility 404 can optionally have associated a configuration 406 specific to the contexts 402 for the authentication facility 404. For example, where an authentication facility 404 is configurable, such as a type of biometric authentication facility or a length and/or makeup of a password, such facility can be configured individually for each rule by way of the configuration information 406. In this way the service 206 (or other entity for which the rules are defined, such as virtual machine or computing environment) can tailor the authentication facilities 202.

Returning to FIG. 2, the virtualized computing environment 200 further includes an authentication facility selector 214 as a software, hardware or firmware component operable to select one or more of the shared authentication facilities 202 for the service 206. The selector 214 includes a launcher component 216 operable to instantiate, launch, run or otherwise execute one or more of the authentication facilities 202 constituting a workflow defined by an rule in the set of rules 212. The launcher is initially responsive to the receipt of a user request 222 from the user 220 for access to the restricted resource 208. The user request 222 has associated a user context 224 defining one or more characteristics of the user 220 as described above with respect to the rules 212. The selector 214, with the launcher 216, executes authentication facilities 202 in accordance with an authentication rule 212 retrieved based on a user context 224 for the received request 222. In one embodiment, the selector 216 is adapted to receive or access the rules 212, such as by accessing the store 210, to identify one or more rules 212 as applicable rules based on the user context 224. Alternatively, the service 206 or virtual machine 204 can undertake the identification of applicable rules 212 based on the user context 224.

Depending on the user context 224, multiple rules may be identified as applicable rules. For example, a first rule relating to a user context 402 defined in terms of a security feature of a device used by the user 220, and a second rule relating to a user context 402 defined in terms of a recency of previous access by the user 220, could both be applicable for the user 220 in a given context 224. In such a situation, rules 212 may be ranked, organized or ordered so that rules assume an order of precedence. One way to order the rules 212 is based on a level of assurance of an authentication workflow for the authentication facilities 404 identified for a rule. A level of assurance can be an objective or subjective measure of assurance for a workflow providing for the comparison, ranking and selection between rules 212. For example, in one embodiment, each authentication facility in the set of authentication facilities 202 has associated an authentication assurance level. An assurance level can be predetermined by an administrator of the computing environment 200 or can be the result of an objective assessment or measurement of the assurance of the authentication facility. For example, a rate of false positive authentications from a history of authentications by a facility can be used. In a further example, a biometric authentication facility can have an assurance level determined based on a rate of false matching and/or false rejection. Further, a level of assurance for an authentication facility could be based on both the facility itself and a particular configuration of the facility, such as a configuration 406 defined for a rule in the set of rules 212. For example, a configuration of a strength of a passphrase can influence a measure of assurance for a passphrase-based authentication facility. For example, a strength of a passphrase can be based on, inter alia: a length of the passphrase; a number and variety of characters in the passphrase (alphabetics, numerics, mixed-case, symbols etc.); a frequency of revision of the passphrase; and the like. Thus, where multiple rules in the set of rules 212 are identified for a particular user context 224, a ranking of the rules 212 can be undertaken based on a level of assurance of the rules which can be based on a level of assurance of the authentication facilities specified by the rules. In this way a rule having a greater level of assurance can be selected where the user context 224 satisfies multiple rules.

In an alternative embodiment, the selection of a rule where multiple rules are satisfied by the user context 224 can be based on a random, cyclic or other selection. Such a selection can be beneficial in order to, for example, reduce or eliminate the predictability of the authentication workflow employed by the computing environment 200 for the service 206.

Figure 3:
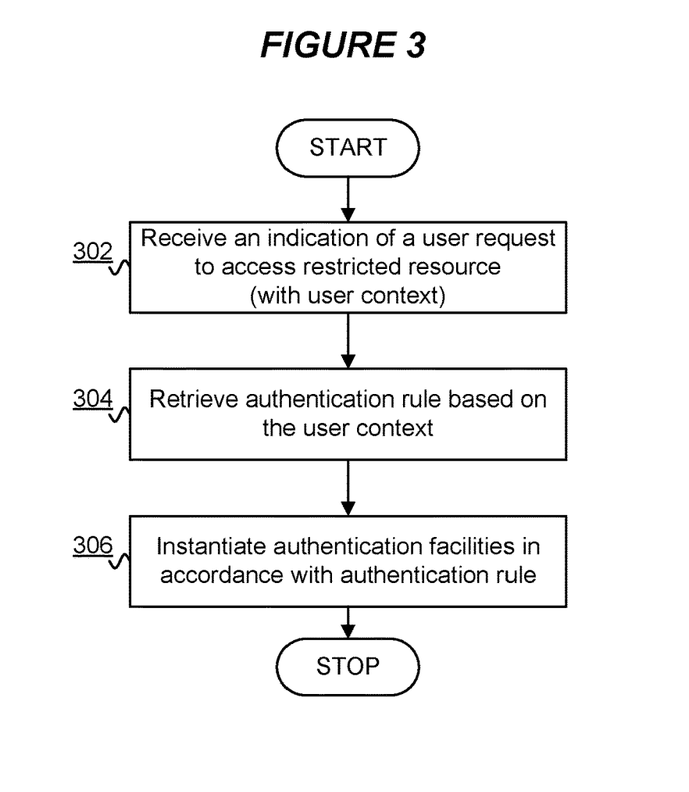
FIG. 3 is a flowchart of a method of the authentication facility selector of FIG. 2 in accordance with embodiments of the present disclosure.

FIG. 3 is a flowchart of a method of the authentication facility selector 214 of FIG. 2 in accordance with embodiments of the present disclosure. Initially, at 302, the selector 214 receives an indication of the receipt of the user request 222 by the service 206. In one embodiment, the service 206 indicates the receipt of the user request 222 by notifying or triggering the selector 214. In another embodiment, the service communicates all or part of the user request 222 to the selector 214. In some embodiments, the selector 214 can be comprised as part of, or operable in association with, the service 206 such as a software library, facility, component or application executable with or as part of the service 206. In such embodiments the receipt of the request 222 can itself be an indication to the selector of receipt. Notably, the request 222 includes the user context 224.

Subsequently, at 304, the selector retrieves an authentication rule from the set of rules 212 based on the user context 224 associated with the user request 222, as described above. Notably, the retrieval may be undertaken by the service 206 and a selected rule, or a workflow for a rule, can be communicated to the selector 214. At 306 the selector 214, with the launcher 216, instantiates, launches, runs, loads, calls or otherwise executes authentication facilities in the set of shared authentication facilities 202 in accordance with a workflow of authentication facilities 404 defined for the retrieved rule. Where an authentication workflow includes a definition of a configuration for an authentication facility, such configuration is additionally applied.

Thus, in this way, authentication facilities for the user request 222 are instantiated according to the authentication rules 212 in order that appropriate and compliant authentication challenges 218 are communicated to the user 220. The instantiated authentication facilities are taken from a set of shared authentication facilities 202 configured based on a configuration 406 stored as part of, with, or in association with, the authentication rules 212. The instantiated authentication facilities are selected based on a user context 224 associated with the request 222 and defined by the rules 212. Accordingly, embodiments of the present disclosure provide compliant authentication methods for services 206 using shared authentication facilities 202 without a need to individualize authentication facilities within services 206 or virtual machines 204.

Figure 5:
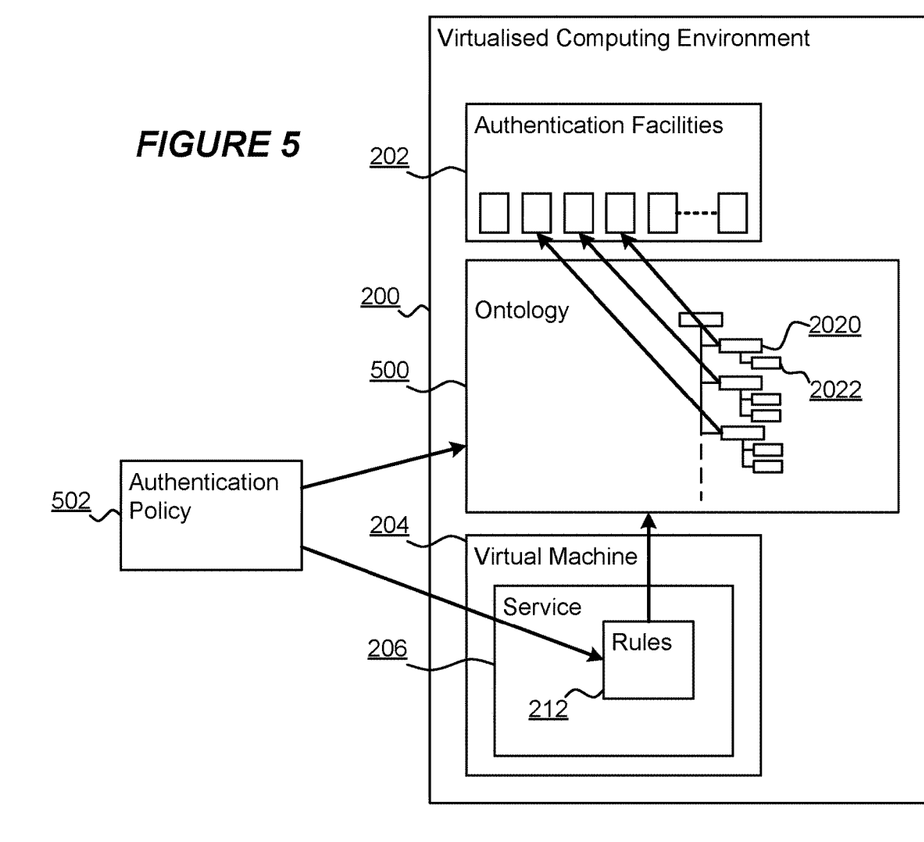
FIG. 5 is a component diagram of the virtualized computing environment of FIG. 2 for the creation of a compliant authentication management scheme for the service in accordance with embodiments of the present disclosure.

FIG. 5 is a component diagram of the virtualized computing environment 200 of FIG. 2 for the creation of a compliant authentication management scheme for the service 206 in accordance with embodiments of the present disclosure. Many of the features of FIG. 5 are identical to those described above with respect to FIG. 2 and these will not be repeated here. Additional features of FIG. 2, while absent in FIG. 5, are nonetheless considered included in the arrangement of FIG. 5. An authentication policy 502 is a formalized or human-readable policy specification for authentication services associated with the service 206. The authentication policy defines criteria or requirements necessary for an authentication scheme associated with the service 206 to be considered compliant. For example, minimum standards of authentication can be stipulated in the policy 502. In practical terms such policy standards can include: a strength of passphrases; a requirement for token based authentication; a requirement for and/or stipulation of a type of biometric authentication; a requirement for re-authentication periodically, with a definition of such period; a requirement for multi-factor authentication such as two-factor authentication involving two separate authentication facilities in conjunction; and the like. The authentication policy 502 can be specific to the service 206. For example, where the service relates to a particular type of software application or industry solution, such as a financial services application, then authentication compliance requirements defined in the policy 502 can derive from industry standards or regulatory requirements for financial applications. Similarly, services requiring legal, statutory, regulatory or other confidentiality, restriction, limitation and/or access control can have associated authentication policies.

In accordance with an embodiment of the present disclosure, the authentication policy is embodied as a combination of a set of rules 212 as hereinbefore described. Further, in one embodiment, the authentication policy is partly embodied in an ontology 500 of authentication concepts. The ontology 500 is an arrangement of concepts defining available authentication facilities, relationships between facilities and attributes and/or configurations of facilities. For example, the ontology 500 is defined using an ontology specification language such as Web Ontology Language (OWL). In an embodiment, the ontology 500 is a directed tree structure of concepts 2020 such that a concept can have a single parent and any number of child concepts. The ontology 500 represents authentication facilities from the set of shared authentication facilities 202. For example, authentication facilities are represented in the ontology 500 as concepts 2020 in the ontology. In one embodiment, the ontology 500 constitutes the set of shared authentication facilities 202 such that it is not necessary to have a separate repository or registry of facilities and the ontology 500. The ontology 500 provides for the representation of both authentication facilities and at least part of the authentication policy in a single structure. It is also possible to define "cross concept" relationships between concepts in the ontology 500. This means that a concept can have a property 2022 linked to another concept or property anywhere in the ontology 500. For example, a concept representing a "Password" authentication facility can include a property called "hasPasswordPolicy" which is associated with a password policy concept "PasswordPolicy." A "PasswordPolicy" concept includes policy criteria such as a minimum password length, a minimum number of upper case letters, etc.

The description of concepts and their relationship has the following nature. The ontology 500 provides for:
- Equivalence: a relationship between concepts that indicates one concept is equivalent to one or more other concepts. Equivalence is helpful in reflecting the authentication in the ontology 500 because it provides for the definition of alternative, equivalent, concepts representing alternative, equivalent authentication facilities. In one embodiment a concept can be declared equivalent to another concept if it matches the properties of that concept. For example, a concept of "Strong_two_factor_authentication" can be defined as a compliance requirement in the ontology 500. Such a concept can also be declared equivalent to an aggregate concept which includes, as properties, two further authentication facility concepts aggregated, such as a "Token" based authentication concept and a "Password" based authentication concept.
- Sub-concept and child concept relationships.
- Membership which can return all members of a concept (attributes and concepts).
- Disjunction which can model mutual exclusivity of instantiations of concepts. For example, an authentication method that is biometric cannot be an instance of a password.

Concepts in the ontology 500 are assigned properties. A concept that is given a property is the "domain," and the "range" is a set of classes that are related to such property. This approach allows for the creation of relationship between concepts. Using such a model it is possible to represent compliance rules that can be validated against concept (authentication facility) instantiations. For example, we can express that a biometric compliance requirement must satisfy predetermined "false match" and "a false detection" rates. This serves to identify which biometric authentication facilities (represented as concepts in the ontology 500) satisfy the compliance requirement. Properties declared for concepts in the ontology 500 can have any or all of the following attributes:
- Functionality: there is only one member within the range for one instance. For example, a concept "Password" can only have one "PasswordPolicy."
- Inverse Functionality: a value within a range can only apply to one instance of a concept. For instance, a "PrivateKey" can only be given to a single "User."
- Transitivity: if x hasProperty y, and y hasProperty z, then x hasProperty z.
- Symmetry: x hasProperty y implies y hasProperty x.
- Asymmetry: if x hasProperty y then y hasProperty x is false.
- Reflexivity: the ability for a concept instance to be its own property, i.e. x hasProperty x
- Irreflexivity: the assertion that x hasProperty x is always false.

These properties provide for flexibility in the ontological representation of the authentication facilities 202 and the authentication policy 502. Other compliance requirements can be represented in the ontology. For example, a password policy can be represented such as a compliance requirement that a password needs to match some strength test to be considered compliant. The following tasks will take place:
- The authentication policy (including the compliance requirement) is encoded using the ontology 500.
- Concept instances that satisfy the compliance requirement are identified using an iterative approach with the ontology 500.
- A list of suitable concepts is extracted from the ontology 500.

The ontology 500 is a logical representation of the authentication facilities 202 which are suitable for implementing authentication schemes compliant with the authentication policy 502. In combination with the ontology 500, compliance rules 212 are defined to contextualize the authentication facilities for the user context 224 and to configure authentication facilities for different user contexts.

Figure 6:
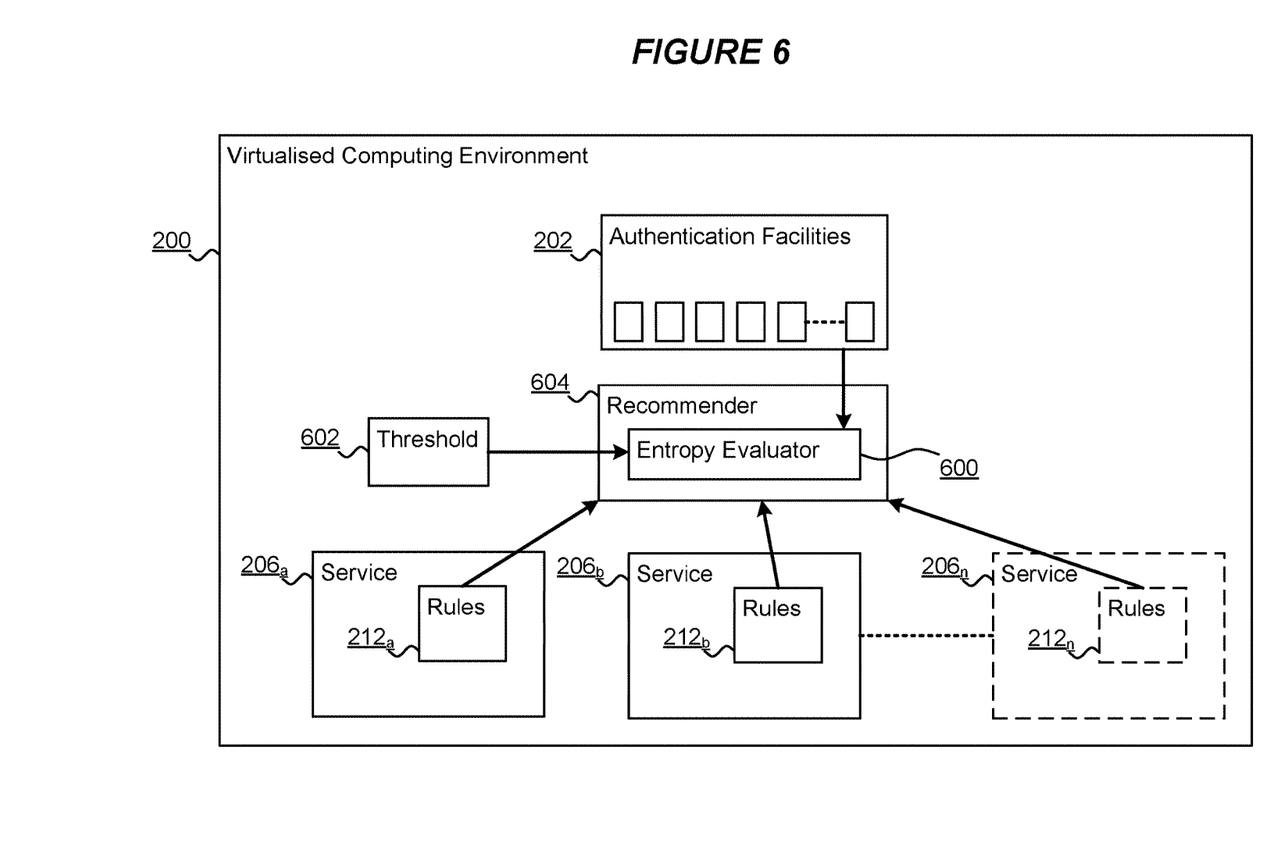
FIG. 6 is a component diagram of the virtualized computing environment 200 of FIG. 2 for the generation of recommended authentication rules 212 for one or more services 206a, 206b, 206n in accordance with embodiments of the present disclosure.

FIG. 6 is a component diagram of the virtualized computing environment 200 of FIG. 2 for the generation of recommended authentication rules 212 for one or more services $206_a$, $206_b$, $206_n$ in accordance with embodiments of the present disclosure. In the arrangement of FIG. 6 multiple services $206_a$, $206_b$, $206_n$ execute in the computing environment 200. Each service $206_a$, $206_b$, $206_n$ includes a set of rules $212_a$, $212_b$, $212_n$ and the services $206_a$, $206_b$, $206_n$ share authentication facilities 202. The services $206_a$, $206_b$, $206_n$ are illustrated without virtual machine associations though it will be appreciated by those skilled in the art that the services $206_a$, $206_b$, $206_n$ execute in one or more virtual machines within the virtualized computing environment 200. Most advantageously, in the embodiment of FIG. 6, the services $206_a$, $206_b$, $206_n$ are similar or related such that they have similar or identical authentication policy 502 requirements. For example, the services $206_a$, $206_b$, $206_n$ are all financial services software components requiring compliance with regulatory authentication policy requirements 502. In one embodiment, the services $206_a$, $206_b$, $206_n$ are all association with a single industry or field of commerce such that compliance requirements and an authentication policy 502 for each service $206_a$, $206_b$, $206_n$ tends to converge. In some embodiments, the services $206_a$, $206_b$, $206_n$ offer similar functionality of facilities and originate from different vendors.

The arrangement of FIG. 6 includes a recommender component 604 including an entropy evaluator 600. The recommender 604 and evaluator 600 are software, hardware or firmware components for evaluating a measure of entropy for the selection, use or instantiation of authentication facilities from the set of shared authentication facilities 202 and identifying recommended authentication rules 212 for services executing in the computing environment 200. The entropy evaluator 600 is in communication with the authentication facilities 202 or, in one embodiment, an ontology 500 representing at least a subset of the authentication facilities 202. A multi-label entropy calculation such as is described in "Knowledge Discovery in Multi-Label Phenotype Data" (Clare & King, pages 42-53, Principles of Data Mining and Knowledge Discovery, 2001). Such an entropy calculation can be summarized as:

$$\sum_{i=1}^{N} (p(c_i)\log p(c_i) + q(c_i)\log q(c_i))$$

where $p(c_i)$ is a relative frequency of a concept (authentication facility) $c_i$, N is a number of concepts (authentication facilities) and $$q(c_i)=1-p(c_i)$$

An entropy threshold 602 is predetermined or learned. In use, the entropy evaluator evaluates a measure of entropy for the frequency of use of each of the shared authentication facilities by the services $206_a$, $206_b$, $206_n$, the measure of entropy indicating a degree of variability of the shared authentication facilities. Lower measure of entropy indicates that the use of authentication facilities 202 by services $206_a$, $206_b$, $206_n$ is consistent between the services $206_a$, $206_b$, $206_n$. Conversely, higher measures of entropy indicate inconsistencies. When the entropy evaluator determines that the evaluated measure of entropy meets or exceeds the threshold measure 602, the recommender 604 compares authentication rules $212_a$, $212_b$, $212_n$ for each of the services $206_a$, $206_b$, $206_n$ to measure similarity of rules. The comparison serves to identify a subset of services having most similar rules as a consistent set. Such subset can be the entire set of services $206_a$, $206_b$, $206_n$. Further, the comparison serves to identify any outlier services as services having rules least consistent with the rules of the services in the consistent set. Subsequently, the recommender 604 is operable to generate one or more recommended rules for the identified outlier services based on the rules of the services in the consistent set, such that rules in the consistent set that are not present in the identified outlier services are recommended for the outlier services.

Thus, in this way for similar or related services $206_a$, $206_b$, $206_n$, inconsistent application of the authentication facilities 202 can be identified and acted upon by discerning outlier services and recommended consistent rules for application of an authentication policy.

Suggestions for rules 212 and the definition of the ontology 500 of concepts can be further based on monitoring ontology definitions made by administrators of the computing environment 200 for past services. Administrators select authentication facilities from the shared authentication facilities 202 to implement an authentication policy 502. Subsequent ontology definitions can benefit from suggestions based on previous ontology definitions for similar, the same or related services, such as services in the same commercial, industrial or technical field and arising from different vendors. Such suggestions arise from a multiple dimensional distribution tree reflecting the ontological definitions for all previous services. Such a tree can mix multiple simple decision trees into one structure with relationships between nodes and leaves that can be coded in an ontology 500 and can also be modeled in probability calculations. In its simplest form, a multi-label classifier is employed. Such a classifier is able to assign a multiplicity of authentication facilities to a service as part of an authentication scheme definition. Such classifications can be used as suggestions to assist not only with compliant authentication scheme definitions but also best practice in the field.

Since one or more services s are selected, the size of the domain D is combinatorial such that $D=2^s$. The multi-label entropy calculation described above can further be applied.

In one embodiment, an authentication workflow defined by the rules 212 and employed for the user 220 is recorded. Subsequent changes to the authentication facilities 202, the ontology 500 or the rules 212 that constitute changes to the authentication workflow employed to authenticate user 220 can be identified in order to trigger a re-authentication of the user 220. For example, if an authentication facility used to authenticate user 220 is identified as flawed, erroneous or compromised, the ontology 500 and/or rules 212 can be updated to avoid, replace or remediate the facility. The record of authentication workflows employed for user 220 can be reviewed to identify that the facility used to authenticate user 220 is undermined and an immediate, real-time re-authentication of user 220 can be instigated using an alternative or remediated authentication scheme. In this way, real time rectification and/or repetition of authentication can be achieved in the event of changes to the authentication schemes. A similar approach is equally applicable in the event of changes to compliance requirements, such as changes to the authentication policy 502. For example, a sudden elevation in security level for the computing environment 200—such as in response to an emerging security event—can result in a wholesale increase in authentication assurance by redefinition of the authentication policy 502. Such redefinition leading to modifications to the ontology 500 and/or rules 212 can be detected in real time, and along with records of authenticated users, users can be required to immediately re-authenticate to satisfy up-to-date requirements.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has described example embodiments, the invention is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A user authentication method for a software service executing in a virtual machine of a shared computing environment, wherein the software service is one of a plurality of services executing in the shared computing environment, the user authentication method comprising:
   receiving, by one or more hardware processors, an indication of a user request to access a restricted resource of the software service, the user request having associated a user context defining one or more characteristics of the user;
   retrieving, by the one or more hardware processors, an authentication rule for the software service based on the user context, the authentication rule identifying one or more shared authentication facilities for the shared computing environment; and
   instantiating, by the one or more hardware processors, one or more authentication facilities in accordance with the authentication rule to generate one or more challenges for the user so as to authenticate the user;
   recording, by the one or more hardware processors, the instantiated authentication facilities in association with an identification of the user so as to trigger re-authentication of the user in the event of a change to at least one of: the authentication rule and the one or more shared authentication facilities;
   evaluating, by the one or more hardware processors, a measure of entropy for the frequency of use of each of the shared authentication facilities by the software services, the measure of entropy indicating a degree of variability of the shared authentication facilities; and
   in response to a determination that the measure of entropy meets a threshold measure, performing, by the one or more hardware processors:
   (a) comparing authentication rules for each of the software services to measure relatedness of rules to identify a set of software services having most related rules as a consistent set, and to further identify one or more outlier services as software services having rules least consistent with the rules of the software services in the consistent set; and
   (b) generating one or more recommended rules for the one or more outlier services based on the rules of the software services in the consistent set,
   wherein the authentication rule further defines one or more parameters for the identified one or more shared authentication facilities.

2. The method of claim 1 wherein the shared computing environment is a cloud computing environment.

3. The method of claim 1 wherein the user context defines characteristics of the user taken from the set of: geographic location characteristics, computer network location characteristics, user device characteristics, user device type, user device facilities, user device capabilities, user device software version and a class of the user in an access control system.

4. The method of claim 1 wherein the authentication facilities are represented in an ontology of concepts, wherein at least a subset of the concepts in the ontology represent at least a subset of the shared authentication facilities.

5. The method of claim 4 wherein the ontology further defines relationships between two or more of the authentication facilities.

6. The method of claim 4 wherein the ontology further defines properties of one or more of the authentication facilities.

7. The method of claim 4 wherein the rule is retrieved from a set of rules, and wherein the ontology and the rule implement a compliance requirement for an authentication scheme of the software service in respect of at least the restricted resource.

8. A selector apparatus to select one or more shared authentication facilities for a software service executing in a virtualized shared computing environment, the software service including an interface through which a user request to access a restricted resource of the software service is receivable, the request having associated a user context defining one or more characteristics of the user, and the software service further having associated a plurality of authentication rules for the software service, wherein each rule is associated with one or more user contexts and identifies one or more shared authentication facilities for the shared computing environment, and wherein the software service is one of a plurality of services executing in the shared computing environment, the selector apparatus comprising:
   a memory; and
   at least one hardware processor configured to execute one or more sets of instructions to implement:
   a launcher, responsive to a user request received via the interface, configured to instantiate one or more authentication facilities in accordance with an authentication rule retrieved based on the user context for the received request, so as to generate one or more challenges for the user to authenticate the user;
   a recorder configured to record instantiated authentication facilities in association with an identification of the user so as to trigger re-authentication of the user in the event of a change to at least one of: the authentication rule and the one or more shared authentication facilities;
   an entropy evaluator configured to evaluate a measure of entropy for the frequency of use of each of the shared authentication facilities by the software services, the measure of entropy indicating a degree of variability of the shared authentication facilities; and
   a recommender responsive to a determination that the measure of entropy meets a threshold measure and configured to:
   (a) compare authentication rules for each of the software services to measure relatedness of rules to identify a set of software services having most related rules as a consistent set, and to further identify one or more outlier services as software services having rules least consistent with the rules of the software services in the consistent set; and
   (b) generate one or more recommended rules for the one or more outlier services based on the rules of the software services in the consistent set,
   wherein the authentication rule further defines one or more parameters for the identified authentication facilities.

9. The selector apparatus claim 8 wherein the shared computing environment is a cloud computing environment.

10. The selector apparatus of claim 8 wherein the user context defines characteristics of the user taken from the set of: geographic location characteristics, computer network location characteristics, user device characteristics, user device type, user device facilities, user device capabilities, user device software version and a class of the user in an access control system.

11. The selector apparatus of claim 8 wherein the authentication facilities are represented in an ontology of concepts such that at least a subset of the concepts in the ontology represent at least a subset of the shared authentication facilities.

12. The selector apparatus of claim 11 wherein the ontology further defines relationships between two or more of the authentication facilities.

13. The selector apparatus of claim 11 wherein the ontology further defines properties of one or more of the authentication facilities.

14. The selector apparatus of claim 11 wherein the rule is retrieved from a set of rules, and wherein the ontology and the rule implement a compliance requirement for an authentication scheme of the software service in respect of at least the restricted resource.

15. A non-transitory computer readable medium for storing computer program code to, when loaded into a computer system and executed thereon, cause the computer system to authenticate a user for a software service executing in a virtual machine of a shared computing environment, wherein the software service is one of a plurality of services executing in the shared computing environment by:

receiving, by one or more hardware processors, an indication of a user request to access a restricted resource of the software service, the user request having associated a user context defining one or more characteristics of the user;

retrieving, by the one or more hardware processors, an authentication rule for the software service based on the user context, the authentication rule identifying one or more shared authentication facilities for the shared computing environment; and instantiating, by the one or more hardware processors, one or more authentication facilities in accordance with the authentication rule to generate one or more challenges for the user so as to authenticate the user;

recording, by the one or more hardware processors, the instantiated authentication facilities in association with an identification of the user so as to trigger re-authentication of the user in the event of a change to at least one of: the authentication rule; and the one or more shared authentication facilities; and evaluating, by the one or more hardware processors, a measure of entropy for the frequency of use of each of the shared authentication facilities by the software services, the measure of entropy indicating a degree of variability of the shared authentication facilities; and in response to a determination that the measure of entropy meets a threshold measure, performing, by the one or more hardware processors:

(a) comparing authentication rules for each of the software services to measure relatedness of rules to identify a set of software services having most related rules as a consistent set, and to further identify one or more outlier services as software services having rules least consistent with the rules of the software services in the consistent set; and (b) generating one or more recommended rules for the one or more outlier services based on the rules of the software services in the consistent set, wherein the authentication rule further defines one or more parameters for the identified one or more shared authentication facilities.

* * * * *